Sept. 15, 1970  I. T. ALLEN ET AL  3,528,200
APPARATUS FOR CONTOUR GRINDING OF VANES AND BLADES
Filed June 17, 1968  3 Sheets-Sheet 1
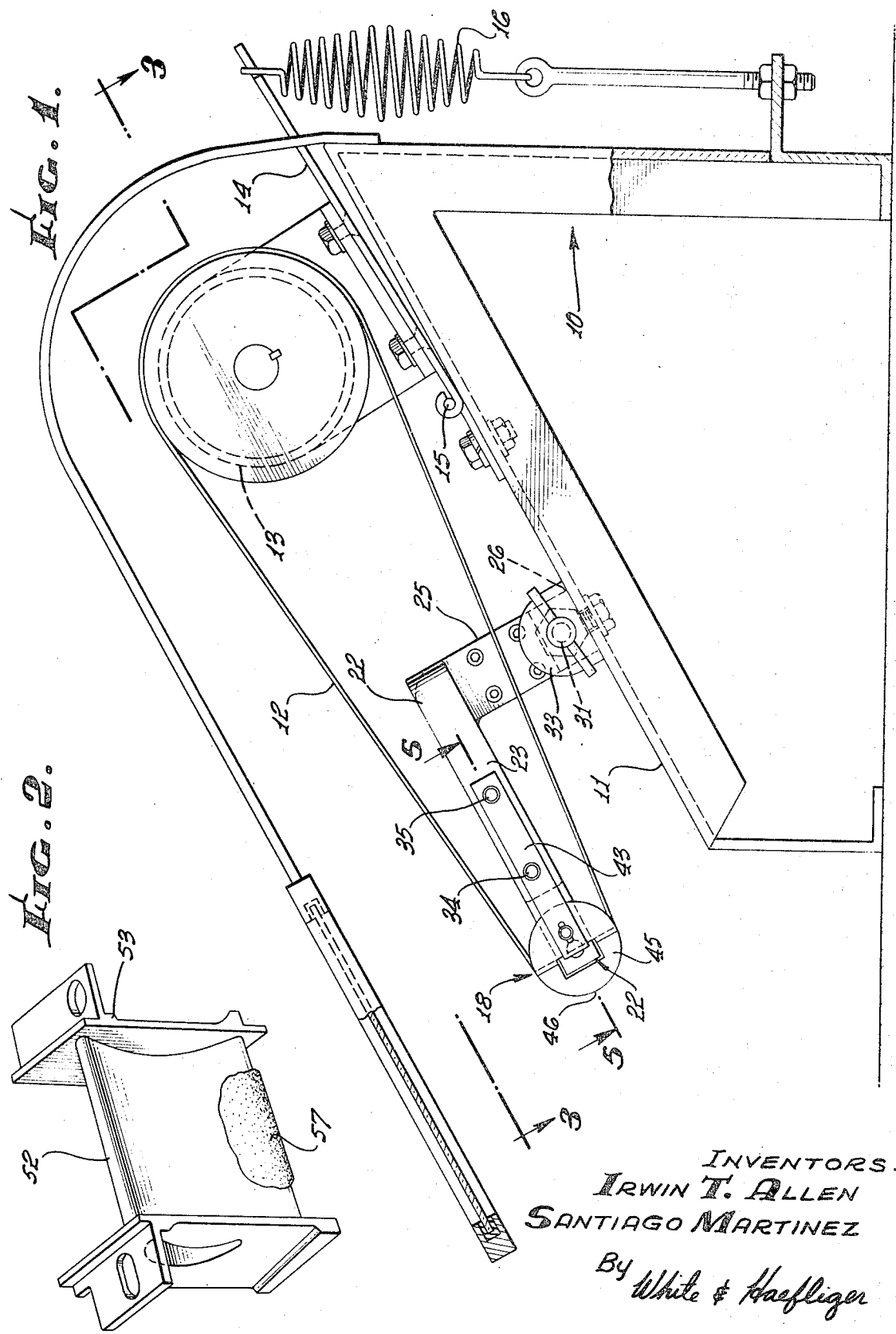
INVENTORS.
IRWIN T. ALLEN
SANTIAGO MARTINEZ
By White & Haefliger
ATTORNEYS.

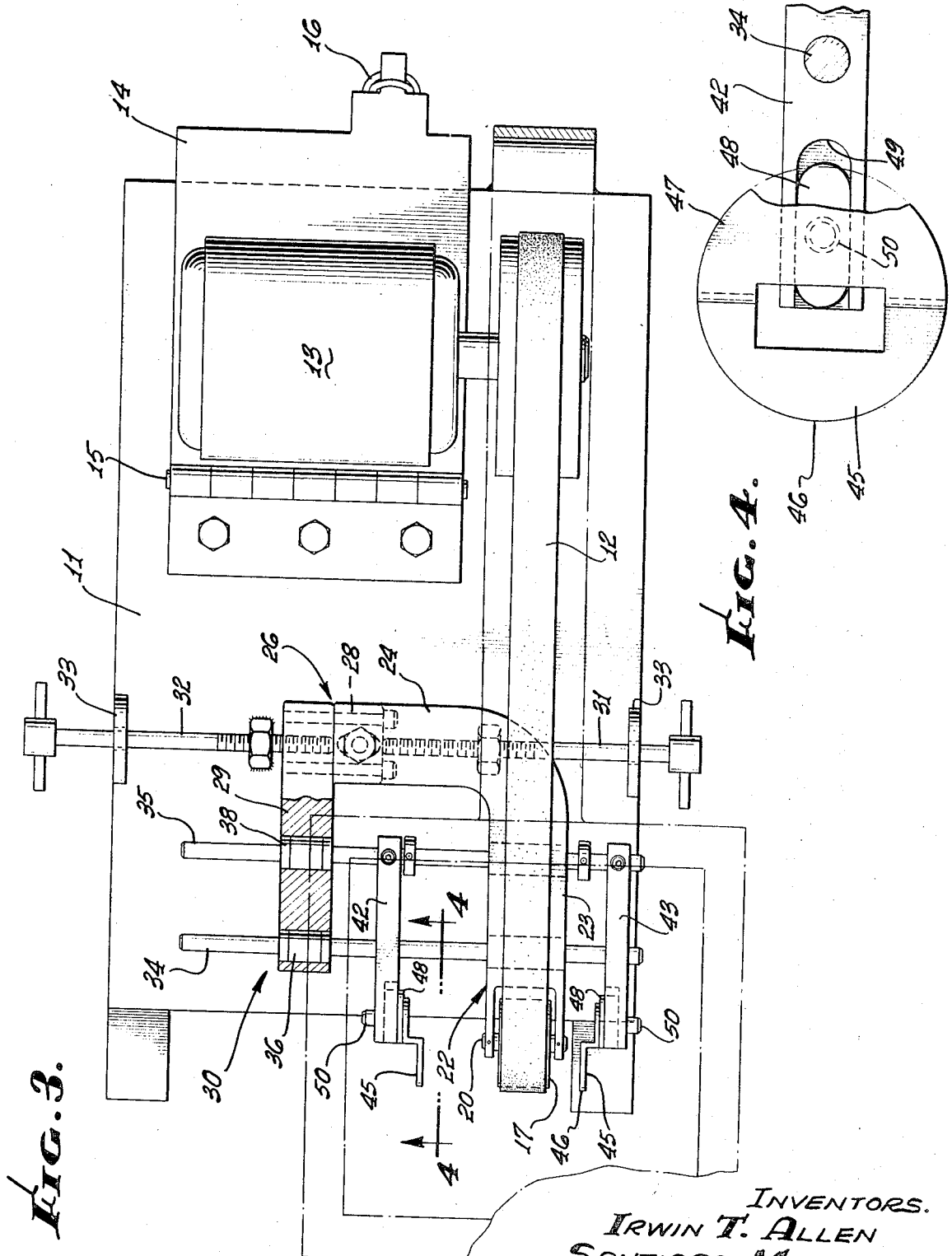

INVENTORS.
IRWIN T. ALLEN
SANTIAGO MARTINEZ
By White & Haefliger
ATTORNEYS.

United States Patent Office 3,528,200
Patented Sept. 15, 1970

3,528,200
APPARATUS FOR CONTOUR GRINDING OF VANES AND BLADES
Irwin T. Allen, Torrance, and Santiago Martinez, Gardena, Calif., assignors to Chromalloy American Corporation, New York, N.Y., a corporation of New York
Filed June 17, 1968, Ser. No. 737,435
Int. Cl. B24b 21/00
U.S. Cl. 51—143                    11 Claims

ABSTRACT OF THE DISCLOSURE

The invention is directed to apparatus for the contour grinding of turbine or jet engine vanes as well as other vane or blade-like forms, after repair by welding. Removal of excess weld deposits from the vane surfaces is accomplished by a rotating abrasive head having circularly arcuate curvature against which the vane is engageable, abrasion of the vane surface being limited by gauges at opposite sides of the head and presenting surfaces in alignment with and curved substantially in accordance with the effective grinding head curvature.

BACKGROUND OF THE INVENTION

In the course of service, gas turbine and jet engine vanes may become cracked or otherwise impaired so as to require repair by welding and contour reconditioning to remove excess weld material and restore the original vane shape.

Such vanes commonly are of curved airfoil cross sectional shape presenting opposite surfaces having different curvatures, and repairs frequently involve welding cracks along the trailing edge of the airfoil section which constitutes the major length of the vane between terminal mounting flanges.

Heretofore removal of excess weld deposits have been accomplished by off-hand grinding on an abrasive belt or grinding wheel, with the result that because of inaccuracies in hand application of the vane to the grinding surface, the vane cannot be finished with either the speed or accuracy to conformance with the initial precise vane shape and smoothness.

THE INVENTION

The present invention relieves the operator from hazarding such inaccuracies by a number of provisions, important among which is the association with a rotatably driven grinding head, of means providing at opposite sides of the head a pair of gauge surfaces curved in substantial accordance with the effective head grinding curvature, the vane being presentable to both the grinding and gauge surfaces so that the latter become engageable with portions of the vane surfaces having true curvature, to thus limit and determine the ground-off extents of the vane to that curvature.

The invention further contemplates association of the gauge surfaces with supporting means so that the grinder head and gauge surfaces are relatively shiftable axially of the head, thus allowing for progressive movements of the vane and excess weldments relatively transversely of the grinding head.

In a typical though preferred embodiment, the grinding head is a terminal portion of an abrasive belt brought about a wheel at the arcuate curvature referred to in the foregoing. Associated with the belt is a carriage shiftable transversely thereof and which mounts the arcuate gauge surfaces, all in a manner such that upon application of the vane to the belt at the location of one end extent of the weld material to be removed, the vane may be shifted with the carriage progressively lengthwise, with turning of the blade as may be required, to progressively remove the welding excesses.

All the various features and objects of the invention as well as the details of an illustrative embodiment will be more fully understood from the following detailed description of the accompanying drawing in which:

BRIEF DESCRIPTION OF THE DRAWINGS

FIG. 1 is a view showing the grinding apparatus in side elevation;

FIG. 2 is a perspective illustration of a conventional turbine or jet engine vane;

FIG. 3 is a cross section taken on broken line 3—3 of FIG. 2;

FIG. 4 is a fragmentary enlarged section as viewed from line 4—4 of FIG. 3;

DESCRIPTION OF THE PREFERRED EMBODIMENTS

Figure 5:
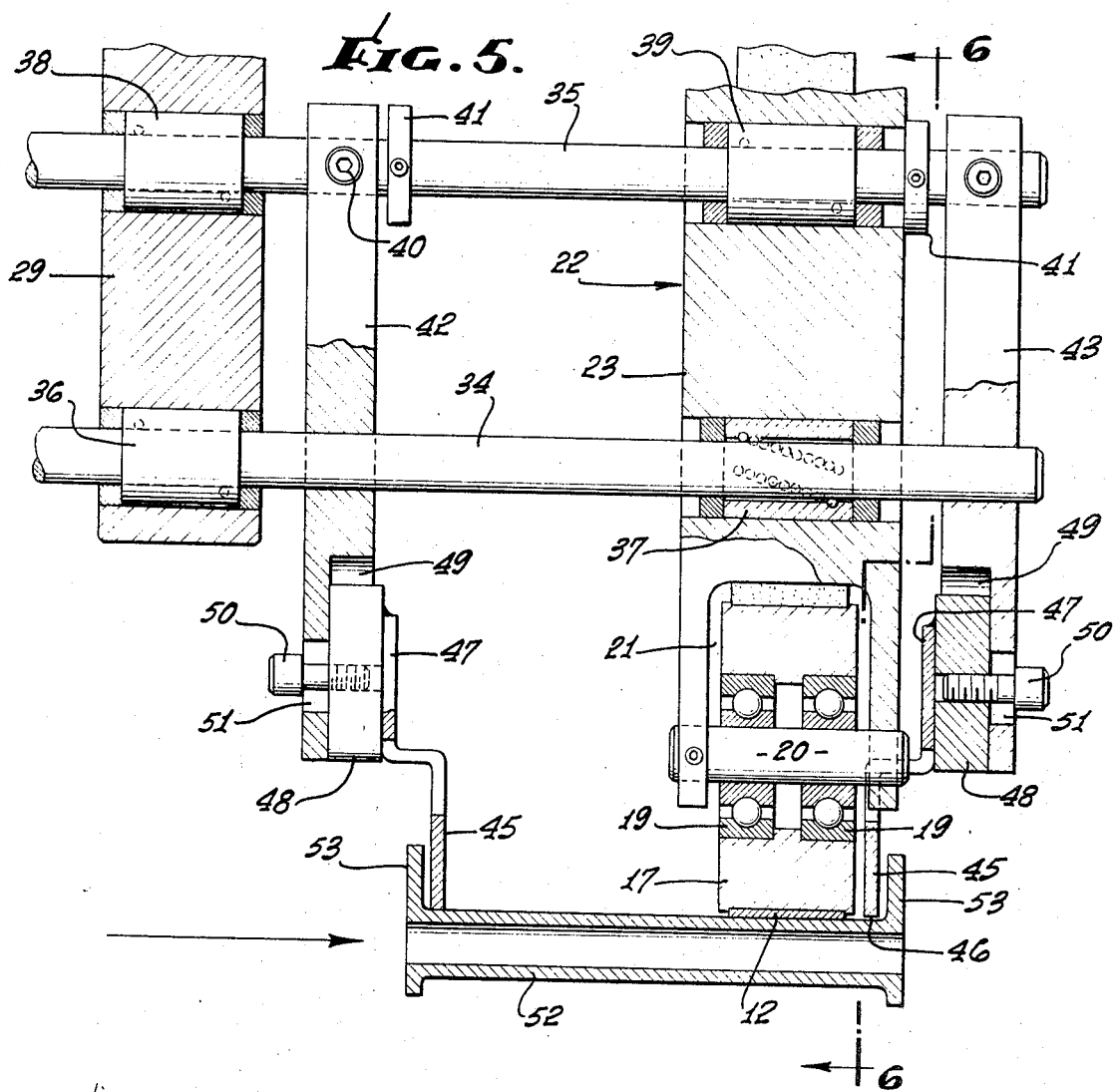
FIG. 5 is an enlarged cross section on line 5—5 of FIG. 1.

In reference first of FIG. 1, the apparatus is shown to be mounted on a frame 10 including an inclined base 11 which supports the grinding apparatus. Typically the latter employs a grinder of the abrasive belt 12 type, the belt being driven by motor 13 carried on mount 14 inclined from its hinge 15 above the base 11. Attached to the motor mount 14 is a spring 16 exerting a downward pull which serves to tension the belt 12.

At its lower terminal the belt 12 together with wheel or pulley 17 about which the belt passes, constitutes what has been termed the grinding head, generally indicated at 18, the effective radial and circularly arcuate curvature of which is that of the belt surface against which the vane is applied as will later appear. The wheel 17 is journaled by bearings 19 on shaft 20 which bridges recess 21 in an arm structure generally indicated at 22, having as illustrated in FIG. 1 a lower extent 23 which may parallel the base 11, and a lateral extension 24 terminating at an integral post portion 25 having its footing at 26 on the base. At its upper end the post portion 25 is connected as by screws 28 to an arm 29 which parallels arm 23 to accommodate a laterally shiftable carriage generally indicated at 30. In reference to FIG. 3 the positions of the arms 23 and 29 laterally of the bed 11 may be adjusted or set by screws 31 and 32 extending through supports 33.

The carriage 30 comprises a pair of shafts 34 and 35 extending through bearings at 36, 37 and 38, 39 within arms 23 and 29. Shaft 35 attaches as by set screws 40 at the outsides of a pair of adjustable stop rings 41, to a pair of arms 42 and 43 through which both of the shafts pass. The arms 42 and 43 may be attached to shaft 34 in the manner of the shaft 35 connection therewith so that both shafts are shiftable within their bearings, or the arms may be left unattached to shaft 34 so as to slide thereon during transverse shifting of the carriage by axial movement of shaft 35 within the bearings 38 and 39, in which case shaft 34 serves as a stationary guide support for the arms.

Arms 42 and 43 terminally mount a pair of gauge elements 45 at opposite sides of the head 18 and presenting arcuate surfaces 46 in alignment with the surface of the abrasive belt 12 and with the same or close to the same curvature. While capable of various specific forms, the gauge elements 45 are shown to be the terminal inwardly offset extents of straps 47 welded to blocks 48 accommodated within the arm recesses 49. The gauge surfaces 46 are adjustable for accurate alignment with the belt surface by providing set screws 50 threaded into blocks 48 and shiftable therewith in the arm slots 51. By reason of adjustability of arms 42 and 43 on shaft 35, the spacing and positioning of the gauge elements are correspondingly adjustable.

Figure 6:
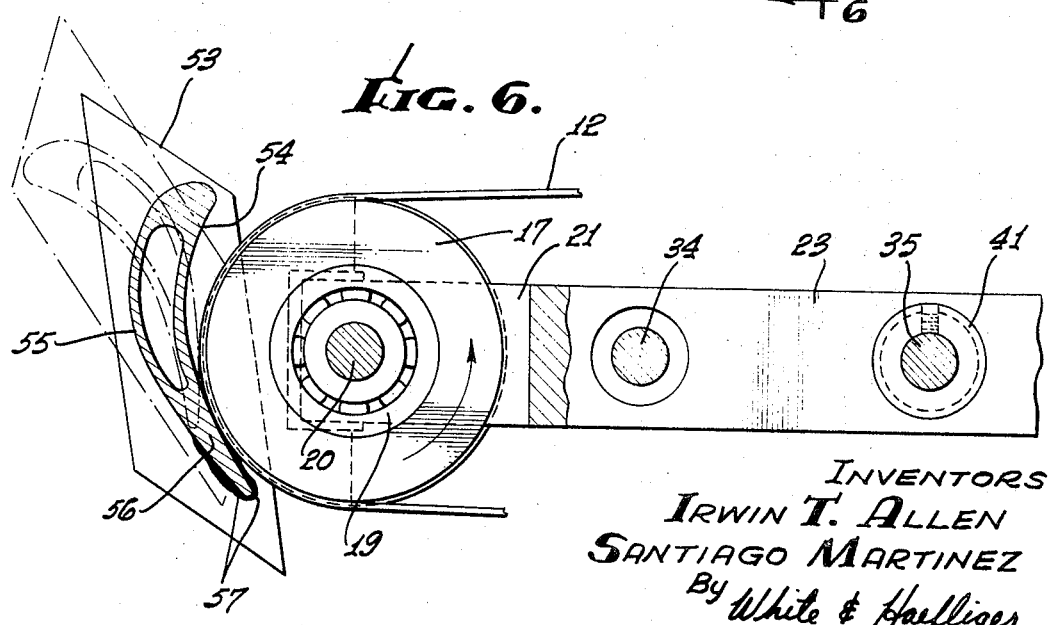
FIG. 6 is a fragmentary section in the lower plane of broken line 6—6 in FIG. 5.

As previously indicated, the apparatus is particularly adaptable to the surface grinding of a vane having the configuration illustrated in FIGS. 2 and 6 wherein the body 52 of the vane has the FIG. 6 airfoil shape in cross section, the vane terminals being in the form of flange structures 53 which mount the vane within a turbine or engine. Opposite surfaces 54 and 55 of the vane have different curvatures greater than that of the effective belt and gauge curvatures so that the grinder surface has close to linear or tangential contact with that portion of the vane surface to be abraded. Most commonly, although fractures may occur elsewhere, the vane tends to develop cracks toward its trailing edge 56 where the vane is repaired, by welding which leaves residual excess welding material 57 on either or both surfaces of the vane.

In the operation of removing such excess, the vane is manually applied to the grinding head as illustrated in FIG. 5 where the gauge elements 45 both are engageable upon removal of the excess material 57 at any belt location, against end surfaces of the vane body 52 which, being in reinforced proximity to the flanges 53, may be free from impairment and therefore have the initial or normal transverse blade shape. With the vane so positioned, initial grinding off of the weld material 57 occurs across the width of the belt and transversely of the vane surface as it may be rocked in contact with the belt. The depth of the grind penetration however is limited and kept in correspondence with the true blade contour, by engagement of the vane against the gauge surfaces 46. The grinding operation to the same effect and in the same manner occurs as the vane together with the carriage arms 42, 43 and the gauges 45 are progressively shifted across the face of the belt 12. The final result is resurfacing of the vane shape in virtually exact correspondence with the normal contours.

We claim:

1. Grinding apparatus useable for the removal of excess weld deposits from the surfaces of turbine and jet engine guide vanes of curved airfoil cross sectional shape, comprising a grinder head having a circularly arcuate rotating abrasive surface against which side surfaces of the vane are selectively engageable, a carriage shiftable axially of the grinder head, means on said carriage presenting beyond opposite sides of said head a pair of gauge surfaces curved substantially in correspondence with said arcuate abrasive surface and against which the vane is engageable at alined locations longitudinally of the vane to limit the vane surface abrasion upon engagement of both gauge surfaces with the vane surface, the vane being shiftable with the carriage to progressively grind the vane surface.

2. Apparatus according to claim 1 including a support for said grinding head, and means mounting the carriage to said support.

3. Apparatus according to claim 1, in which said grinding head is the terminal of an abrasive belt passing about a wheel, said abrasive surface being the arcuate belt surface about the wheel.

4. Apparatus according to claim 1, including means for adjusting said gauge surfaces radially thereof and relative to the grinder head abrasive surface.

5. Apparatus according to claim 1, including means for varying the spacing of said gauge surface.

6. Apparatus according to claim 4, including means for varying the spacing of said gauge surfaces.

7. Apparatus according to claim 3, including means for supporting said grinding head and belt and also said carriage for shifting movement.

8. Apparatus according to claim 7, in which said carriage comprises a pair of parallel shafts shiftable relative to said supporting means.

9. Apparatus according to claim 7, in which said carriage comprises a pair of arms carrying said gauge surfaces.

10. Apparatus according to claim 9, in which the gauge surfaces are variably adjustable relative to said arms.

11. Apparatus according to claim 10, in which said apparatus is mounted on an inclined base and includes a transparent visor overlying the grinder head.

References Cited

UNITED STATES PATENTS

| | | | |
|---|---|---|---|
| 903,048 | 11/1908 | Boley | 51—220 |
| 2,837,877 | 6/1958 | Andrus | 51—143 |
| 2,841,930 | 7/1958 | Horst | 51—231 |

OTHELL M. SIMPSON, Primary Examiner

U.S. Cl. X.R.

51—230